United States Patent [19]
Kozai et al.

[11] Patent Number: 6,113,834
[45] Date of Patent: Sep. 5, 2000

[54] COOLING DEVICE ATTACHED TO INDEX MACHINE

[75] Inventors: Michael T Kozai, Scarborough; Ronald Ing, Etobicoke; William J Jacovich, Newmarket; Robert Domodossola, Brampton; Steve Saggese, Bolton, all of Canada

[73] Assignee: Husky Injection Molding Systems Ltd., Canada

[21] Appl. No.: 09/263,393

[22] Filed: Mar. 5, 1999

Related U.S. Application Data

[63] Continuation of application No. 09/217,141, Dec. 21, 1998, abandoned.

[51] Int. Cl.[7] ................................................... B29C 45/42
[52] U.S. Cl. ........................ 264/335; 264/336; 425/547; 425/552; 425/556
[58] Field of Search ................................ 425/546, 547, 425/552, 556, 437; 264/297.2, 328.8, 335, 336, 538

[56] References Cited

U.S. PATENT DOCUMENTS

| | | |
|---|---|---|
| Re. 33,237 | 6/1990 | Delfer, III . |
| 4,729,732 | 3/1988 | Schad et al. . |
| 5,728,409 | 3/1998 | Schad et al. . |

*Primary Examiner*—Tim Heitbrink
*Attorney, Agent, or Firm*—Bachman & LaPointe, P.C.

[57] ABSTRACT

The present invention relates to a device for cooling molded parts and for transporting the molded parts from a receiving position to a holding/ejecting position. The device of the present invention has particular utility with an index molding machine having a rotary turret block with at least two movable mold halves thereon. The cooling device includes a cooling station assembly having a plurality of blowing tubes for applying a cooling fluid to external surfaces of molded parts, a take-off plate having a plurality of holders for receiving cooled molded parts and a connecting plate connecting the take-off plate and the cooling station assembly. The connecting plate is connected to the take-off plate by a pivotable connection and is connected to the cooling station assembly by a rigid connection. The connecting plate is movable along an axis substantially parallel to one of the faces upon which the molded parts to be cooled and removed are positioned. The device further includes a linkage assembly for causing the take-off plate to move between a receiving position and a holding/ejecting position and vice versa. Movement of the take-off plate causes the connecting means to move along the first axis which in turn causes the cooling station assembly to move from a non-cooling position to a cooling position and vice versa. A process for using the device of the present invention as part of a process for molding parts is also described.

26 Claims, 17 Drawing Sheets

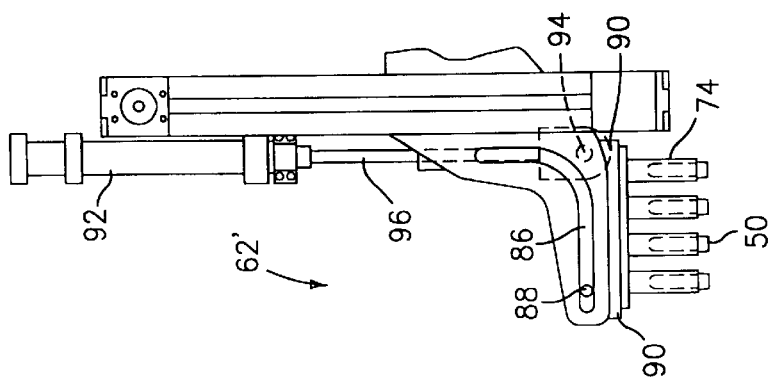
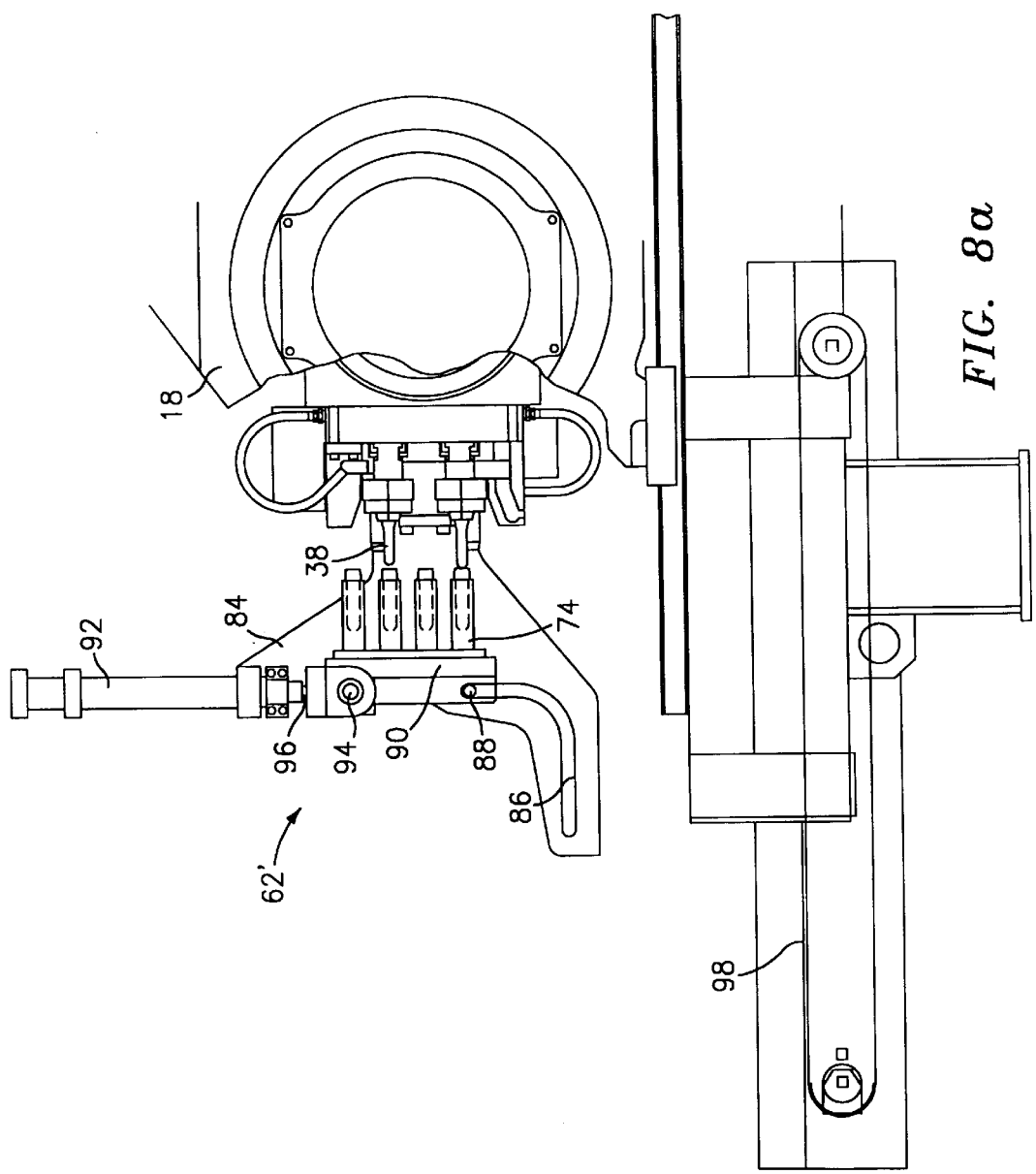

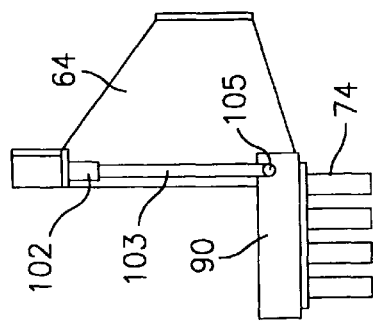
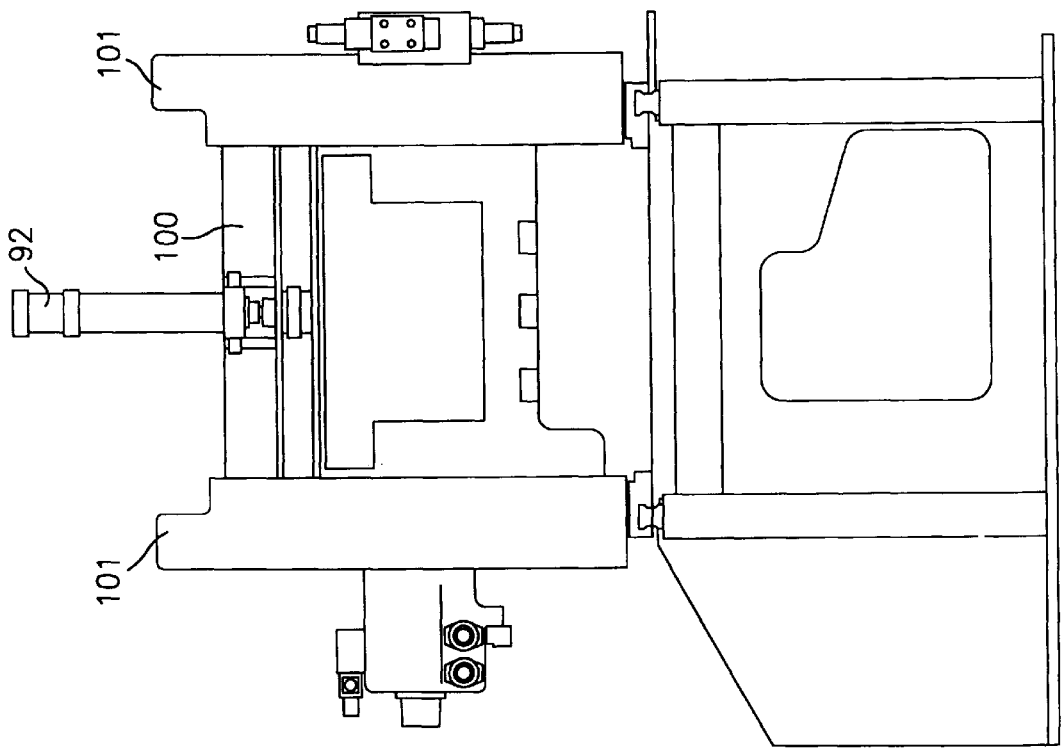

COOLING DEVICE ATTACHED TO INDEX MACHINE

CROSS REFERENCE TO RELATED APPLICATION(S)

The present application is a continuation of U.S. patent application Ser. No. 09/217,141, filed Dec. 21, 1998, now abandoned, entitled COOLING DEVICE ATTACHED TO INDEX MACHINE, By Michael T. Kozai.

BACKGROUND OF THE INVENTION

The present invention relates to an improved device for cooling molded parts having utility in a wide variety of systems and, in particular with a two faced index molding machine.

Index molding machines are known in the art. U.S. Pat. No. 5,728,409, assigned to the assignee of the instant application, shows a four faced turret block with a temperature conditioning station mounted to the turret for directing cooling air onto newly molded articles and a tubular part removal system using an air conveyor. Currently, there is a need for a lower cost molding machine which employs only a two faced turret block and correspondingly half the number of core sets of tooling.

Co-pending, allowed U.S. patent application Ser. No. 08/847,895 to Arnott et al., entitled Injection Molding Machine Having a High Speed Turret, filed Apr. 28, 1997, now U.S. Pat. No. 5,837,301 also assigned to the assignee of the instant application, shows an index molding machine with a two faced turret block. This application however does not discuss the problems of part cooling and controlled part removal.

Co-pending U.S. patent application Ser. No. 09/070,598, to Galt et al., filed Apr. 30, 1998, entitled Tiebar Structure for Injection Molding Machine, also assigned to the assignee of the instant application, shows a two tiebar index molding machine. Here again, there is no discussion of part cooling or part removal.

U.S. Pat. No. 4,729,732 and U.S. Reissue Pat. No. 33,237, both assigned to the assignee of the instant application, show a multi-position tooling plate with water cooled tubes used to remove and cool preforms from a conventional preform molding machine. The tooling plate design shown in these patents has two disadvantages. First, the robot mechanism occupies a substantial floor area adjacent the machine. Second, the preforms are cooled inside their tubes in a horizontal orientation. This has been found to be detrimental in that the weight of the preform causes it to press more firmly against the lower portion of the cooling tube while its upper surface tends to separate from the upper portion of the cooling tube. This unequal contact force with the cooling surface tends to promote unequal cooling of the preform from one side to the other. A vertical orientation during cooling provides a symmetrical weight distribution with a balanced heat removal result.

Conventional index molding machines eject parts at the lowermost station, i.e., when the molded parts to be ejected are under the turret block. There is a need to accommodate part ejection/removal at a station opposite to the molding station to permit two faced turret operation in a molding cycle where the turret rotates 180 degrees each time the mold opens instead of rotating 90 degrees at each mold opening.

One such device for accommodating part ejection/removal at a station opposite to the molding station to permit two faced turret operation is illustrated in co-pending U.S. patent application Ser. No. 09/167,699 to Ing et al., filed Oct. 7, 1998, entitled COOLING DEVICE ATTACHED TO INDEX MACHINE, now U.S. Pat. No. 6,059,557 and assigned to the Assignee of the instant patent application. The instant application shows another device which is capable of accommodating part ejection/removal at a station opposite to the molding station and has particular utility with index injection molding machines.

SUMMARY OF THE INVENTION

Accordingly, it is an object of the present invention to provide a device having improved molded part cooling and improved molded part removal.

It is a further object of the present invention to provide a device as above which may be used with a two faced turret molding machine.

It is yet a further object of the present invention to provide a device as above which allows cooling of the molded part(s) in a vertical orientation.

The foregoing objects are achieved by the molding machine, the device, and the process of the present invention.

In accordance with the present invention, there is provided a device for use with a machine having a rotary turret block mounted within support means and having a first face and a second face. Each of the face has means for holding at least one molded part. The device broadly comprises means for cooling at least one molded part on a respective one of the first and second faces when the respective one of the first and second faces is in a cooling position and means for receiving the at least one molded part from the respective one of the first and second faces after the at least one molded part has been cooled by the cooling means. The receiving means is movable to a first position wherein the at least one molded part is received thereby and to a second position at an angle with respect to the first position. The device further includes a means for connecting the receiving means and the cooling means, which connecting means is movable along a first axis substantially parallel to the respective one of the first and second faces when the respective one of the first and second faces is in the cooling position. The connecting means causes the cooling means to move from a non-cooling position to a molded part cooling position as the receiving means moves from its first position to its second position. The connecting means also causes the cooling means to move from the cooling position to the non-cooling position when the receiving means moves from the second position to the first position.

A process for forming cooled molded parts in accordance with the present invention comprises the steps of providing an index molding machine having a first platen carrying a first mold half having one of at least one mold core and at least one mold cavity and a second platen comprising rotatable turret block means rotatable on a central axis of rotation for bringing at least two movable mold halves into alignment with the first mold half, each of the movable mold halves having one of at least one mold core and at least one mold cavity; moving the rotatable turret block means to bring a first one of the movable mold halves into alignment with the first mold half and then into a mold closed position with the first mold half; clamping the first mold half and the first one of the movable mold halves; injecting molten material into a mold formed by the clamped first mold half and the first one of the movable mold halves to form a first molded part set comprising at least one molded part; holding the first one of the movable mold halves in the mold closed and clamped position while cooling the first molded part set; moving the rotatable turret block means to a mold open position where the first molded part set is positioned on a first one of the movable mold halves; rotating the turret block to bring the first molded part set to a cooling position; positioning a device adjacent the cooling position, which device includes a cooling assembly having means for applying a cooling fluid to each molded part in the first molded set, means for receiving each molded part in the first molded part set, and means connecting the cooling assembly and the receiving means; moving the cooling assembly into a cooling position aligned with the first molded part set and applying a cooling fluid to the first molded part set; translating the cooling assembly along a translation axis substantially perpendicular to the central axis of rotation and thereby moving the receiving means into a first position aligned with the first molded part set; transferring each molded part forming the first set from the first one of the movable mold halves to the receiving means; rotating the receiving means so as to move the receiving means from the first receiving position to a second holding/ejecting position; and the receiving means rotating step causing the connecting means to translate along the translation axis and thereby cause the cooling assembly to move to the cooling position.

Other details of the molding machine, cooling device, and the process of the present invention, as well as other objects and advantages attendant thereto, are set forth in the following detailed description and the accompanying drawings wherein like reference numerals depict like elements.

BRIEF DESCRIPTION OF THE DRAWINGS

FIG. 1b is an end view of the molding machine of FIG. 1a;

FIG. 3 is a partial sectional view of the molding machine of FIG. 1a;

FIG. 4 is a partial sectional view of the molding machine of FIG. 1a;

FIG. 7 is a chart showing the sequence of operation of the molding machine of FIG. 1a;

FIGS. 8a and 8b illustrate an alternative embodiment of a cooling device having multi-position cooling tubes for use with an index molding machine;

FIGS. 9a–9c illustrate an alternative actuation system for the cooling device of FIGS. 8a and 8b;

DETAILED DESCRIPTION OF THE PREFERRED EMBODIMENT(S)

Figure 1A:
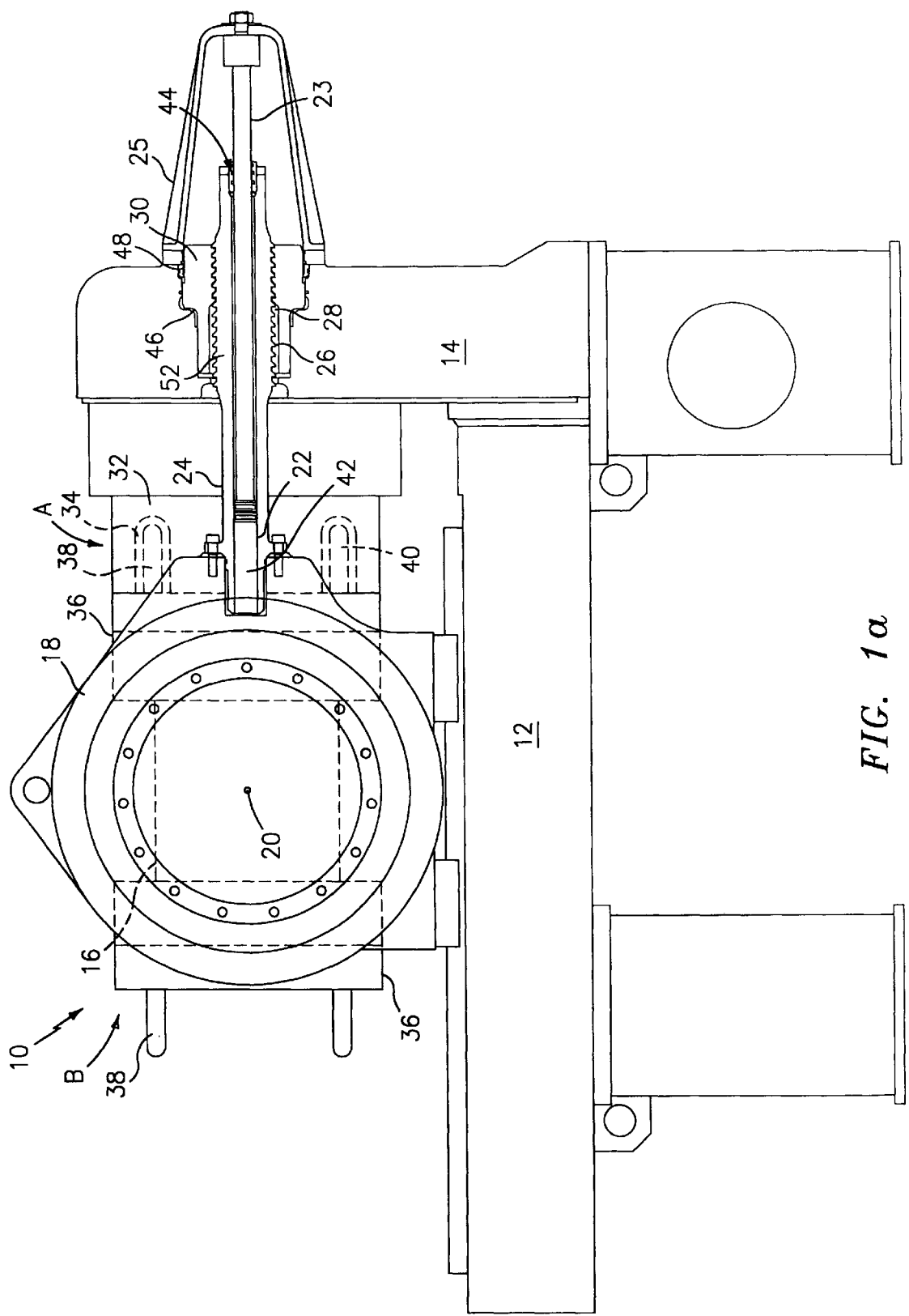
FIG. 1a is a side view of a two tiebar index molding machine.
Figure 1B:
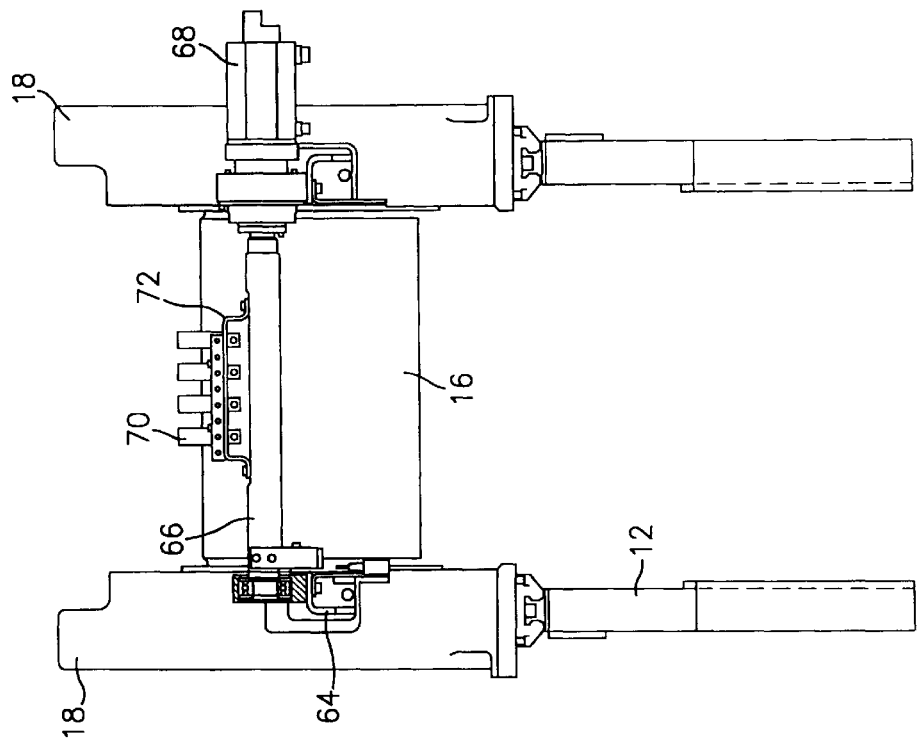

Referring now to the drawings, FIGS. 1a and 1b illustrate a two tiebar index molding machine 10 of the type shown in co-pending U.S. patent application Ser. No. 09/070,598, to Galt et al., entitled Tiebar Structure for Injection Molding Machine, filed Apr. 30, 1998, which is incorporated by reference herein. The index molding machine 10 includes a base 12, a fixed platen 14, and a movable platen 16 which is movable with respect to the fixed platen 14. The movable platen 16 is a two-faced rotary turret block, which is positioned within the movable platen, with pinions in bearings mounted in carriers 18 that slide on the base 12. The turret block 16 is rotated or indexed on a central axis 20 so that the faces thereof represent two positions in an injection molding cycle. Thus, the rotatable turret block 16 is rotatable on a central axis of rotation 20 for rotating a plurality of movable mold halves 36 attached thereto into alignment with a first mold half 32 carried by the fixed platen 14. Each movable mold half 36 includes at least one mold core/cavity. In a preferred embodiment, each movable mold half includes at least one mold core 38 and is matable with the first mold half 32 for forming a mold for forming at least one molded article, with the mold halves being clamped together as will be described hereinafter.

The first mold half 32 may be joined to the fixed platen 14 in any suitable manner known in the art and may contain one or more mold cores or cavities. In a preferred embodiment, the first mold half 32 contains one or more mold cavities 34 which together with the mold core(s) 38 form one or more mold cavity spaces 40. Parts 50, such as preforms, are molded by injecting plastic material through the mold half 32 from an injection unit (not shown) into the cavity space(s) 40 formed by the closed mold.

Two tiebars 24 are provided and bolted to the carriers 18, each of which includes an inside stroke cylinder 22, the rod 23 of which is fixed to housing 25 which in turn is bolted to fixed platen 14. Each tiebar 24 includes external teeth 26 of a rotating clamp piston 30 with the clamp piston contained in fixed platen 14. The clamp piston 30 includes a row of teeth 28 and an adjacent row free from teeth so that on rotation of the clamp piston, the clamp piston teeth 28 alternately engage and disengage the tiebar teeth 26. Clamp piston 30 may be rotated by any desired and convenient means (not shown), such as a cylinder means acting on a pin via a slot in housing 25, such as a cylinder bolted to the fixed platen 14 with linkage means connecting the pins together and causing rotation of the pistons 30.

In operation, a pin (not shown) rotates clamp piston 30 so that clamp piston teeth 28 are disengaged from teeth 26 on tiebars 24. High pressure oil is then supplied to the piston end 42 of stroke cylinder 22 via a line (not shown) causing stroke cylinder rod 23 to extend and move carriers 18 and turret block 16 away from the fixed platen 14, thereby opening the mold. In order to close the mold, oil is supplied to the rod side 44 of stroke cylinder 22 via a line (not shown), thereby retracting stroke cylinder rod 23 and closing the clamp until the mold is closed. The aforementioned pin (not shown) is then activated by a cylinder (not shown) and linkage means (not shown) to engage clamp piston teeth 28 with tiebar teeth 26. High pressure oil is then provided to the clamp piston cylinder 46 causing the clamp pistons to clamp the mold. After molding, high pressure oil is provided to the mold break cylinder 48 causing clamp piston 30 to act on the back side of tiebar teeth 26 and urge the mold open. After a short stroke, clamp piston 30 is de-energized and the pin actuated by the aforementioned cylinder and linkage means causes the clamp piston to rotate to disengage clamp piston teeth 28 from tiebar teeth 26 so that stroke cylinder 22 can open the mold.

As shown in FIG. 1a, the turret block 16 has two faces, each with a mold core plate 36 mounted to it. Each mold core plate 36 may be mounted to a respective face of the turret block 16 using any suitable conventional means known in the art. In a preferred embodiment, each mold core plate 36 has a plurality of core pins 38, equal in number to the number of mold cavities 34 in the first mold half 32. As can be seen in FIG. 1a, a first set A of core pins 38 is aligned with the mold cavities 34 in a molding position, while a second set B of core pins 38 are in a cooling position located 180 degrees from the molding position.

After plastic material has been injected into the mold cavity spaces 40 and the molded parts 50 have been formed, the parts 50 are partially cooled in a customary manner by cooling circuits (not shown), such as water cooling circuits, in the mold cavity plate 32 and in the core pins 38. After partial cooling has occurred and the parts 50 have been sufficiently solidified to avoid part deformation, the mold is opened in the manner previously discussed and the molded parts 50 on the first set A of core pins 38 are withdrawn from the mold cavities 34. The turret block 16 is then rotated 180 degrees to present the second set B of core pins 38 for molding while the first set A of core pins 38, complete with the molded parts 50 thereon, are presented at the opposite side of the turret block for further cooling.

In accordance with a first embodiment of the present invention, a device 62 is provided to cool the molded parts and remove them from the core pins 38 when the molded parts are in the cooling position. The device 62 includes a frame 64 attached to the carrier 18 or its support. A cross beam 66 is attached to the frame 64 so as to be capable of rotation through a 90 degree angle. The end of the cross beam 66 remote from the frame 64 is connected to a drive means 68 for rotating the cross beam 66 through said 90 degree rotation. The drive means 68 may comprise any suitable drive means known in the art.

Figure 2A:
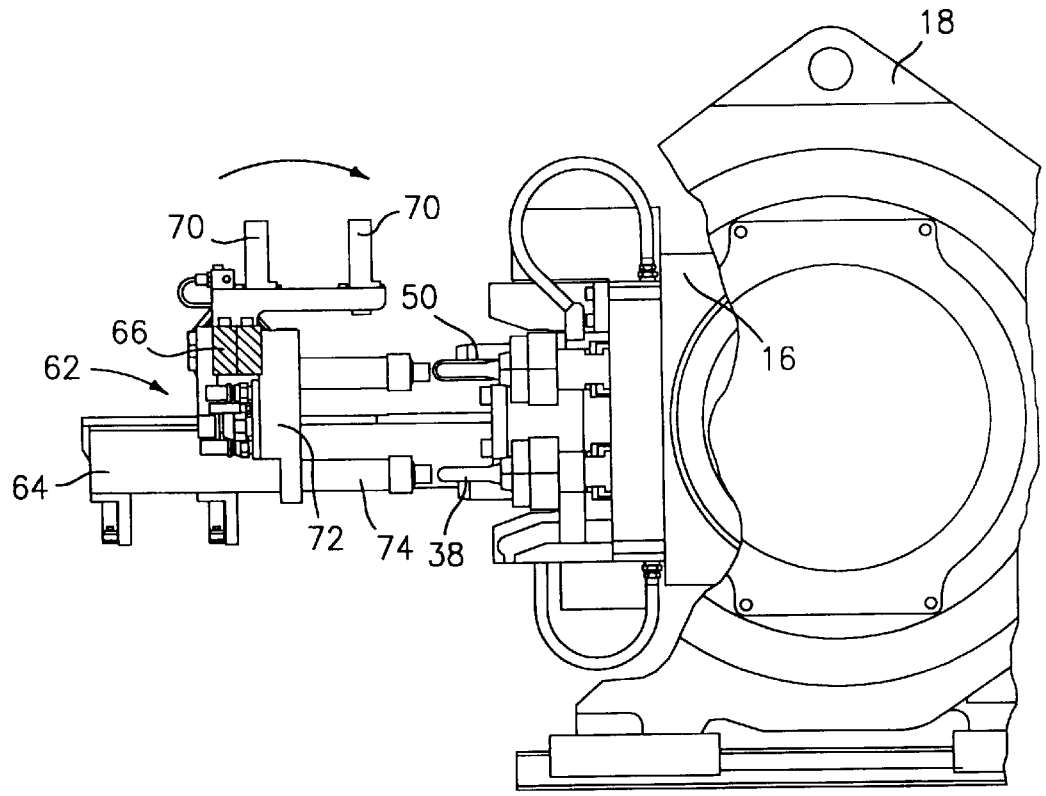
FIG. 2a is a side view of a first embodiment of a cooling device in accordance with the present invention.
Figure 2B:
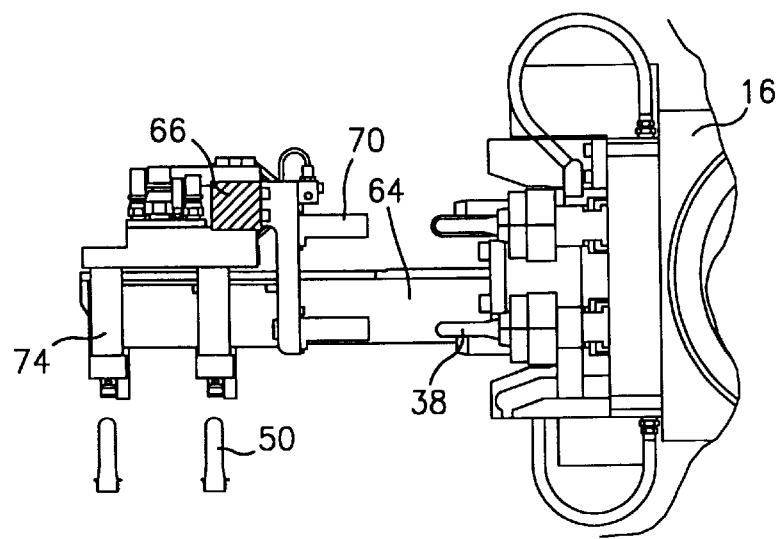
FIG. 2b is a side view of the cooling device of FIG. 2a showing the cooling tubes in a part removing position.

A set of blowing tubes 70 is mounted to a first surface of a head or carrier plate 72 attached to the cross beam 66. The blowing tubes 70 are used to direct a cooling fluid, typically air, toward an end of the molded parts 50, while the parts 50 are on the core pins 38. This blowing position is shown in FIG. 2b. Cooling fluid may be supplied to the blowing tubes 70 in any suitable manner known in the art.

A set of cooling tubes 74 is mounted to a second surface of the head 72. As can be seen from FIG. 2a, the cooling tubes 74 are offset 90 degrees from the blowing tubes 70. The set of cooling tubes 74 are used to facilitate removal of the molded parts 50 from the core pins 38. The cooling tubes 74 assist the removal of the molded parts 50 through the application of a vacuum inside the tubes 74 in a known fashion. For example, a port (not shown) in the bottom of each tube 74 may be connected to a vacuum source (not shown). The tubes 74 may be cooled by a fluid, such as chilled water, and remove heat from the parts 50 positioned therein either by convection or conduction. For example, cooling may be achieved by intimate contact between exterior surface of the part and the inside surface of the tube as taught by U.S. Pat. No. 4,729,732, which is incorporated by reference herein.

Figure 3:
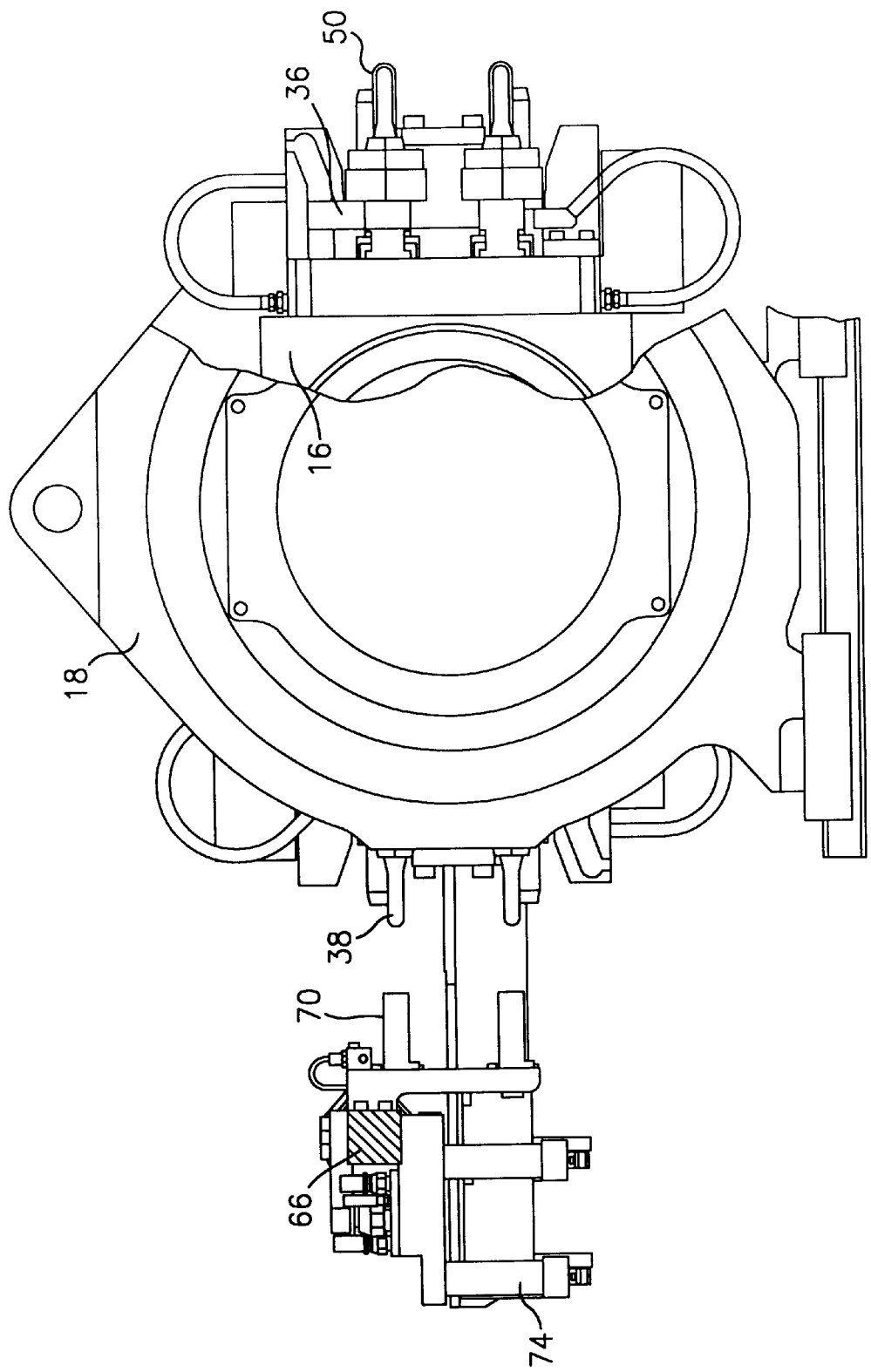
Figure 4:
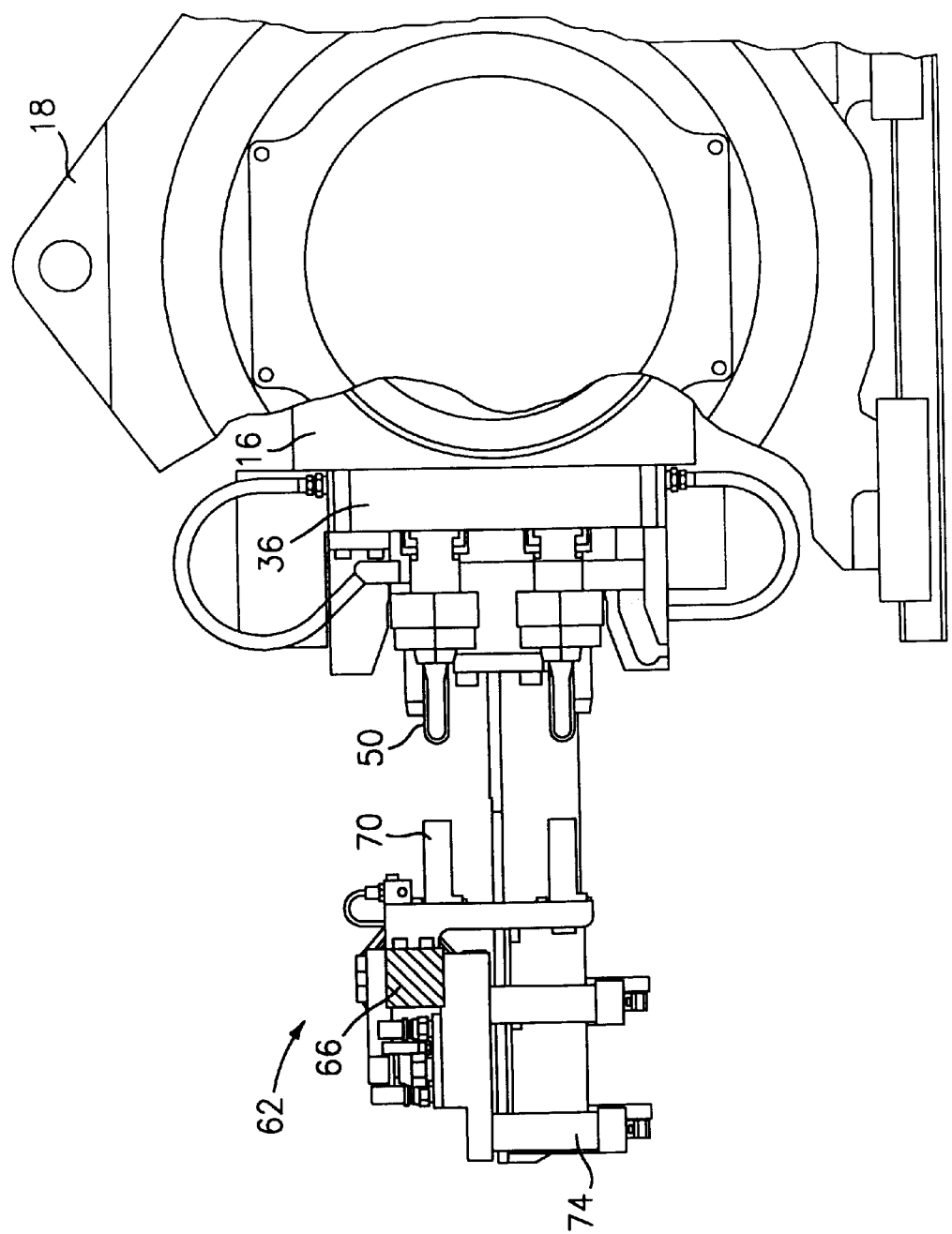
Figure 5:
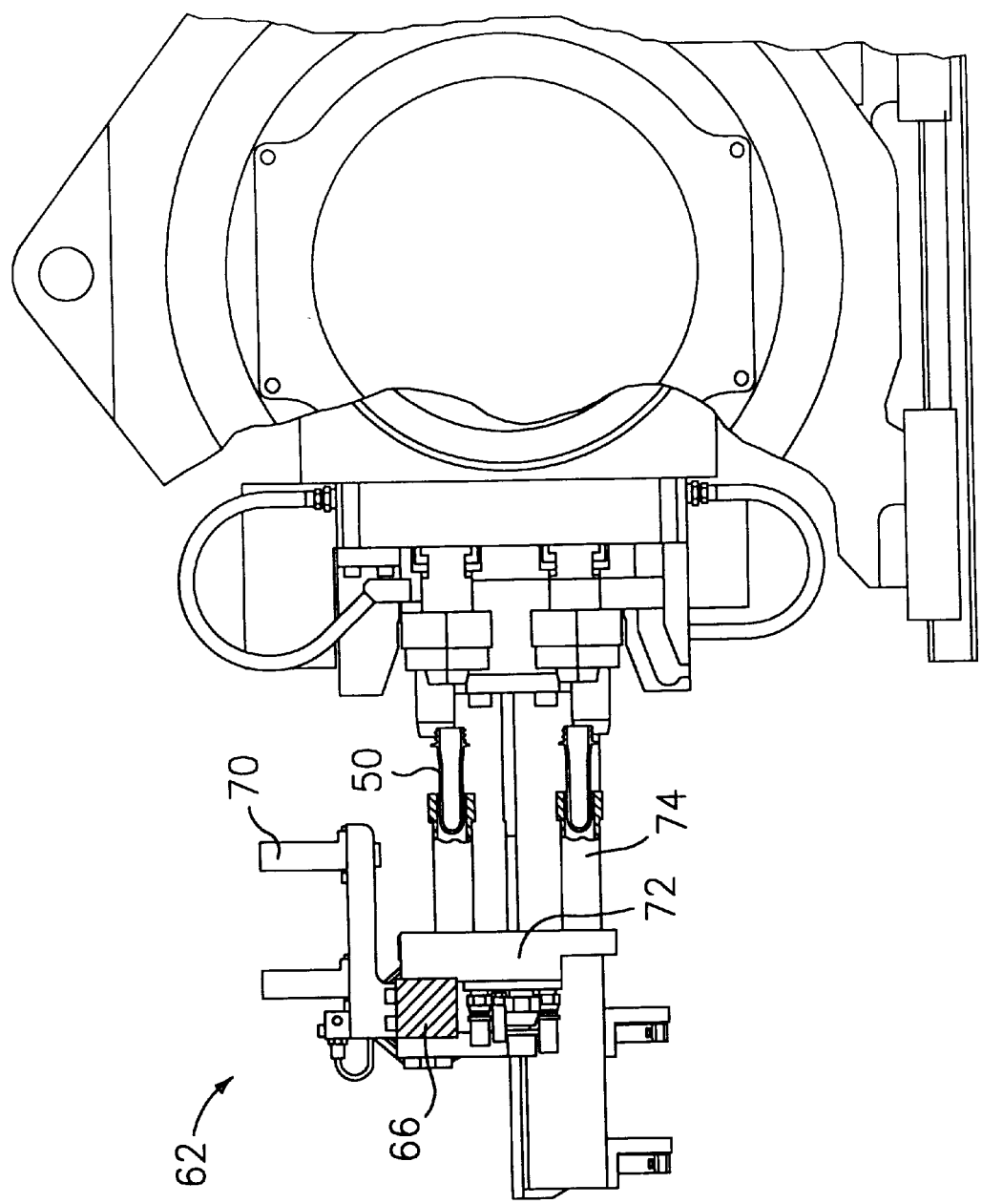
FIG. 5 is a partial sectional view of the molding machine of FIG. 1a in a part transferring mode.
Figure 6:
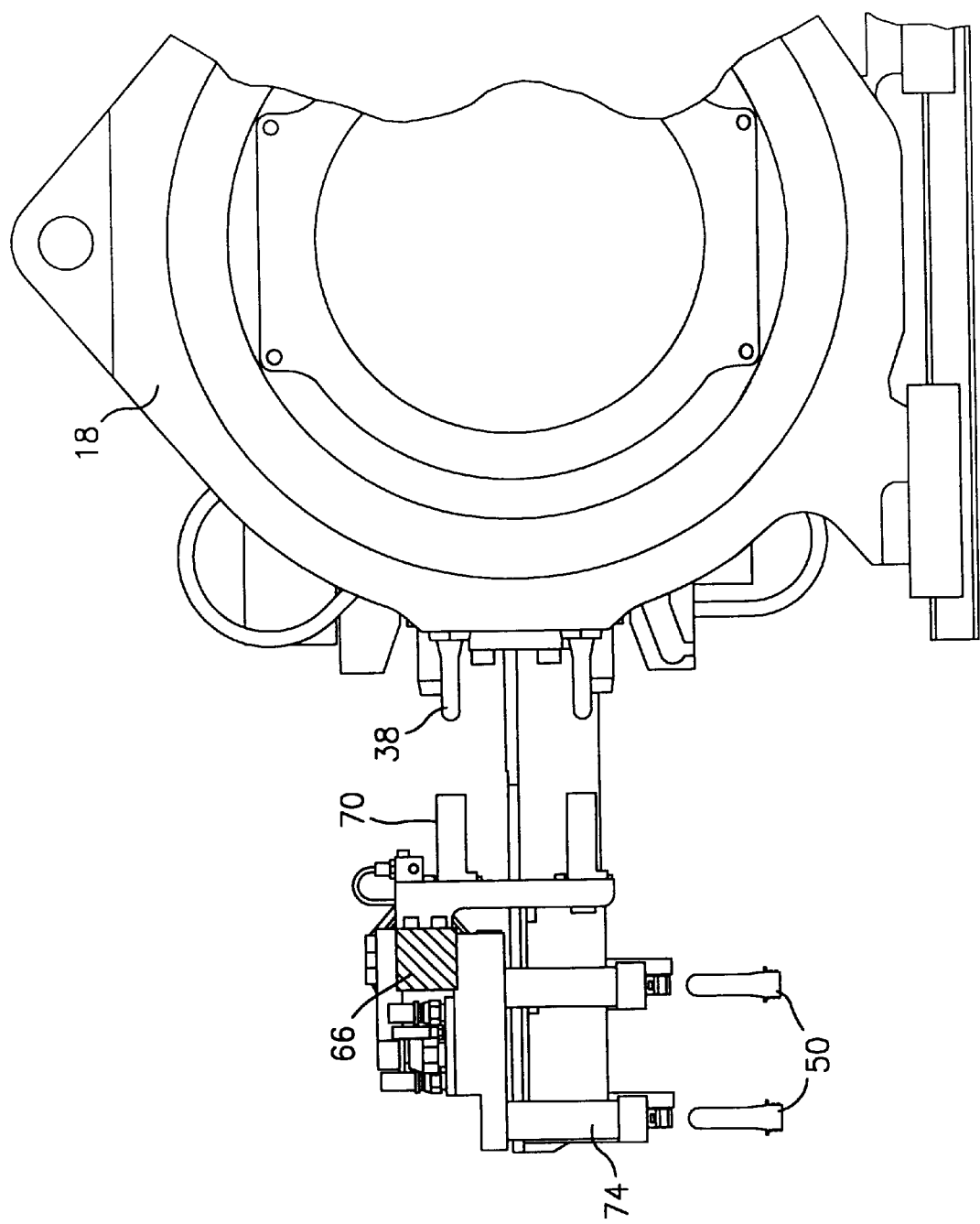
FIG. 6 is a partial sectional view of the molding machine of FIG. 1a with the cooling device ejecting cooled molded parts.

FIGS. 3–6 illustrate the sequence of operation of a molding machine in accordance with the present invention. FIG. 3 shows the clamp closed and the parts 50 being molded on the first core set A. FIG. 4 shows the clamp closed for molding on the second core set B while cooling air is being directed from tubes 70 onto the ends of the molded parts 50 on the first core set A. FIG. 5 shows the cross beam 66 rotated 90 degrees to align the cooling tubes 74 with the parts 50 on the first core set A as the parts are ejected into the tubes 74. Ejection of the molded parts 50 from the core pins 38 into tubes 74 is carried out by the provision of ejection means, such as ejection pins/sleeves or an ejection plate, on each mold face 36. FIG. 6 shows cross beam 66 rotated 90 degrees in the reverse direction to once again align the blowing tubes 70 with the next set of molded parts while the previous set of parts are ejected from cooling tubes 74. Ejection of the cooled parts 50 from the cooling tubes 74 may be effected by discontinuing the vacuum and allowing gravity to cause the parts to drop out of the tubes 74 or by blowing the parts 50 out of the tubes 74 or by mechanical ejection means such as those shown in U.S. Pat. No. 5,447,426, which is incorporated by reference herein.

Figure 7:
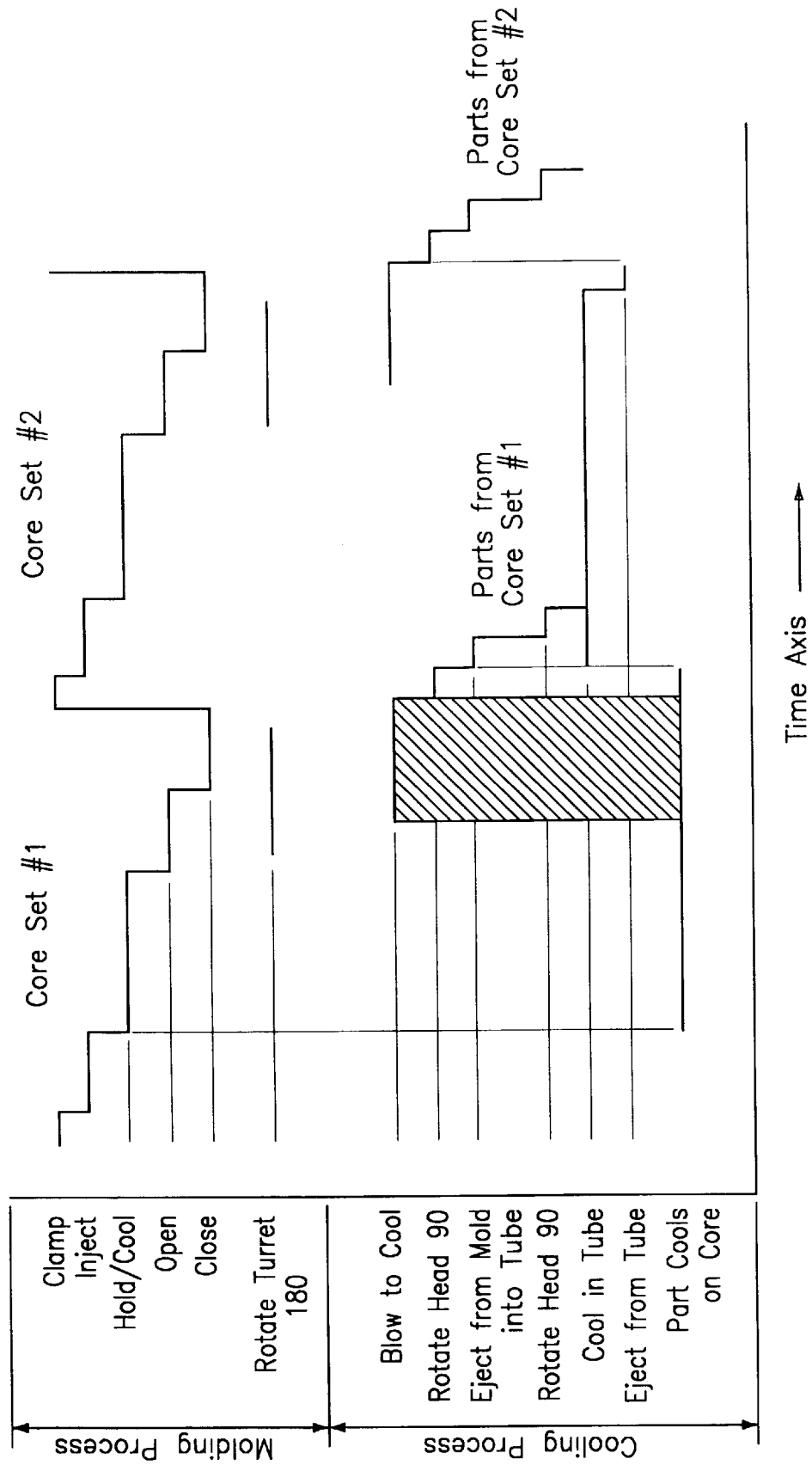

FIG. 7 shows the sequence of operation for making the molded parts 50. The top half of the chart shows the molding process and indicates two identical sequences spaced in time, the first for the first core set A, and the second for the second core set B. Each of the sequences starts with the mold closed, as shown in FIG. 1a. The injection molding sequence of clamp, inject, hold/cool, and open then follows. During the mold opening stroke, the index turret block 16 simultaneously begins to rotate 180 degrees to align the second core set for molding while the first core set, with the molded parts 50 on the core pins 38, is aligned to the cooling and removal device 62. The rotation is completed during the closing stroke of the turret block 16.

The bottom half of the chart shows the cooling process and indicates a sequence that overlaps the two molding processes shown in the top half of the chart. The ejection and cooling sequence begins as the first core set A with molded parts 50 thereon is aligned to the cooling and removal device 62. Cooling fluid, typically compressed air, is blown from tubes 70 directly onto the ends of the molded parts 50, as they remain cooling on the core pins 38. Thus, during this portion of the sequence, parts 50 are cooled both internally and externally. Then the head 72 is rotated 90 degrees to align the cooling tubes 74 with the molded parts 50 on the core pins 38. Next the ejection system of the mold in combination with the vacuum circuit in the cooling tubes 74 transfers the parts from the core pins 38 to the tubes 74 wherein the parts are immediately cooled on their outer surfaces by their contact with the water cooled tubes, in a known fashion. The device 62 is immediately rotated again so that the tubes 74 point downward and the molded parts 50 continue cooling in a vertical orientation to ensure symmetrical cooling and gravitational effects maintaining a distortion-free part. The molded parts 50 are held in the tubes 74 by the applied vacuum and continue to cool until just before it is time to rotate the device 62 back to receive the next set of molded parts from the second core set B. Thus, the cooling time for the complete process optimizes the time the molded parts 50 are cooled, first while in the mold and on the cores and secondly while in the cooling tubes 74. Additional cooling is provided by the air blowing from tubes 70 onto the parts 50 during the shaded portion shown on the chart.

By maximizing the cooling time of the molded parts 50 as described hereinabove, it has been found that only two core sets are required for an optimum molding cycle. Thus the tooling cost for equipping a four faced turret block can be significantly reduced by using only a two faced turret block. The cost of the core sets is halved.

As can be seen from the foregoing discussion, there has been provided in accordance with the present invention a lightweight cooling and part removal device mounted on the moving index carrier that first cools the outside of the part 50 by blowing air and subsequently continues to cool the part 50 inside a cooled tube 74 that also removes the part 50 from the mold. Still further, cooling of the part 50 is performed in a vertical orientation inside a cooled tube 74. As a result, the part 50 has improved properties which are beneficial. Using the device of the present invention, time in this vertical orientation is optimized.

Figure 2C:
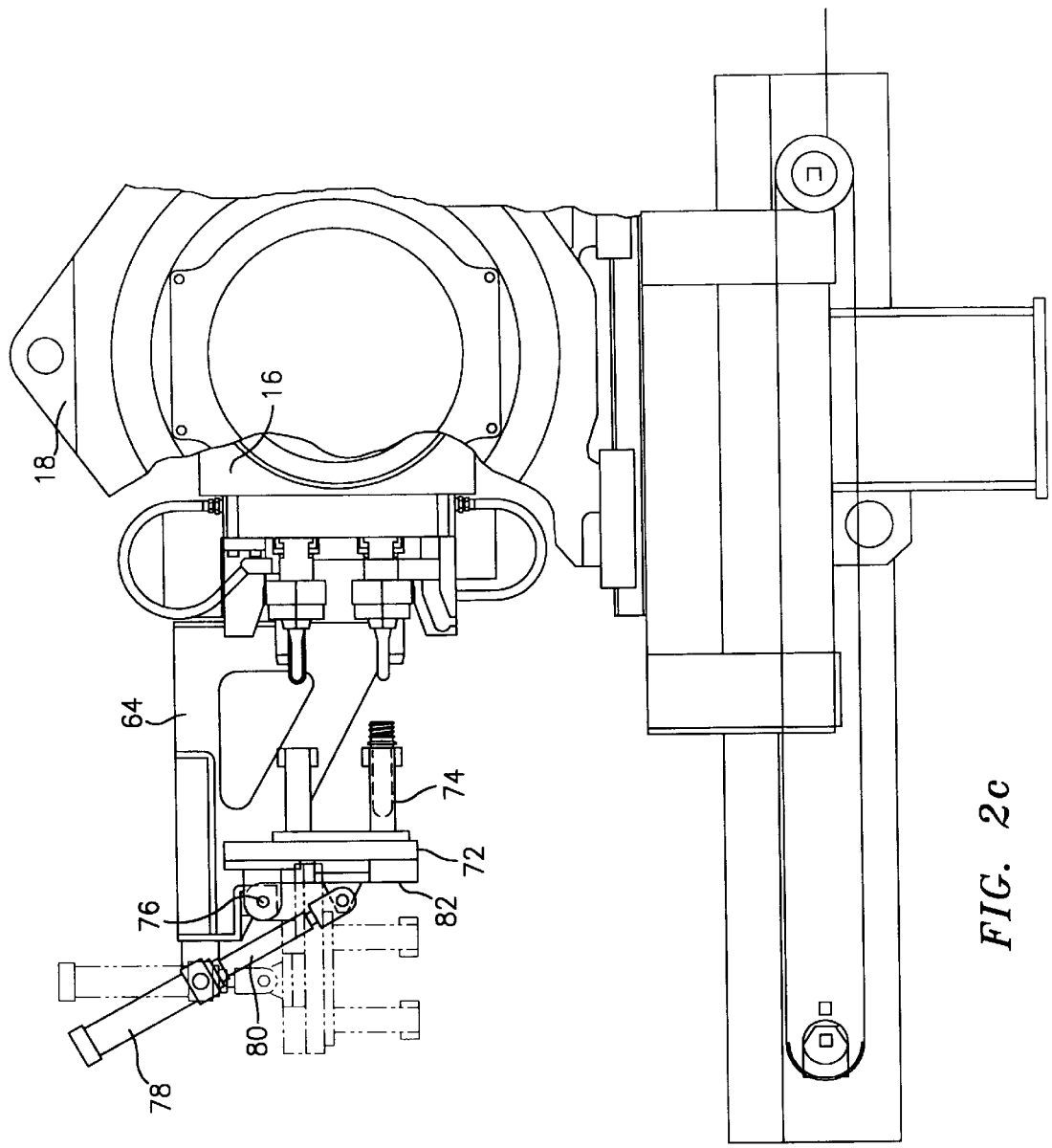
FIG. 2c illustrates an alternative actuation system for moving the cooling device of FIG. 2a between positions.

Referring now to FIG. 2c, an alternative mechanism can be used to rotate a head 72 containing only cooling tubes 72. As shown in this figure, the head 72 may be attached to a frame 64 mounted to one of the carriers 18 by pin connection 76. Further, a piston-cylinder type of actuation unit 78 may be connected to the frame 64. The arm 80 of the actuation unit may be connected to a rear portion 82 of the head 72. As shown in FIG. 2c, the cooling tubes 74 are aligned with core pins 38 and are removing molded articles therefrom. To rotate the head 72 and move the cooling tubes 74 to a vertical orientation, the actuation unit 78 retracts arm 80 and assumes the substantially vertical position shown in dotted lines in the figure.

Referring now to FIGS. 8a and 8b, a second embodiment of the cooling device of the present invention is illustrated. In this embodiment, blowing tubes 70 have been omitted. Instead, the cooling device 62' has additional cooling tubes 74 so that multi-position cooling can be effected in a manner similar to that illustrated in U.S. Reissue Pat. No. 33,237, which is incorporated by reference herein.

As shown in FIG. 8a, the device 62' is mounted in position III on the index machine turret carriage 18. The device 62' has a single side frame 84 mounted to one of the carriers 18 which contains a cam track profile 86. The profile 86 is followed by a cam follower 88 mounted to a movable carrier plate 90 on which are mounted multiple cooling tubes 74. In a preferred embodiment, the number of cooling tubes 74 on the carrier plate 90 is twice the number of core pins 38 on each face of the turret block 16. By providing this number of cooling tubes 74, the molded parts can be held within the cooling tubes 74 for successive molding cycles, thus extending the cooling times which can be achieved.

An actuator 92 is mounted to the side frame 84 and has a journaled connection 94 with the carrier plate 90 such that when the actuators rod 96 is extended the carrier plate 90, following the cam track profile 86, is first translated to move the carrier plate 90 in a vertical direction and then moved from the vertical plane orientation shown in FIG. 8a to the horizontal plane orientation shown in FIG. 8b. During translation, a first set of cooling tubes 74 holding molded parts is moved out of alignment with the core pins 38 and a fresh set of cooling tubes 74 is presented to receive the next set of molded parts. When the carrier plate 90 is in the position shown in FIG. 8b, the parts 50 can be cooled in a vertical orientation and ejected when ready onto the conveyor 98 below. The actuator 92 may comprise any suitable actuator known in the art such as piston-cylinder unit.

Figure 9A:
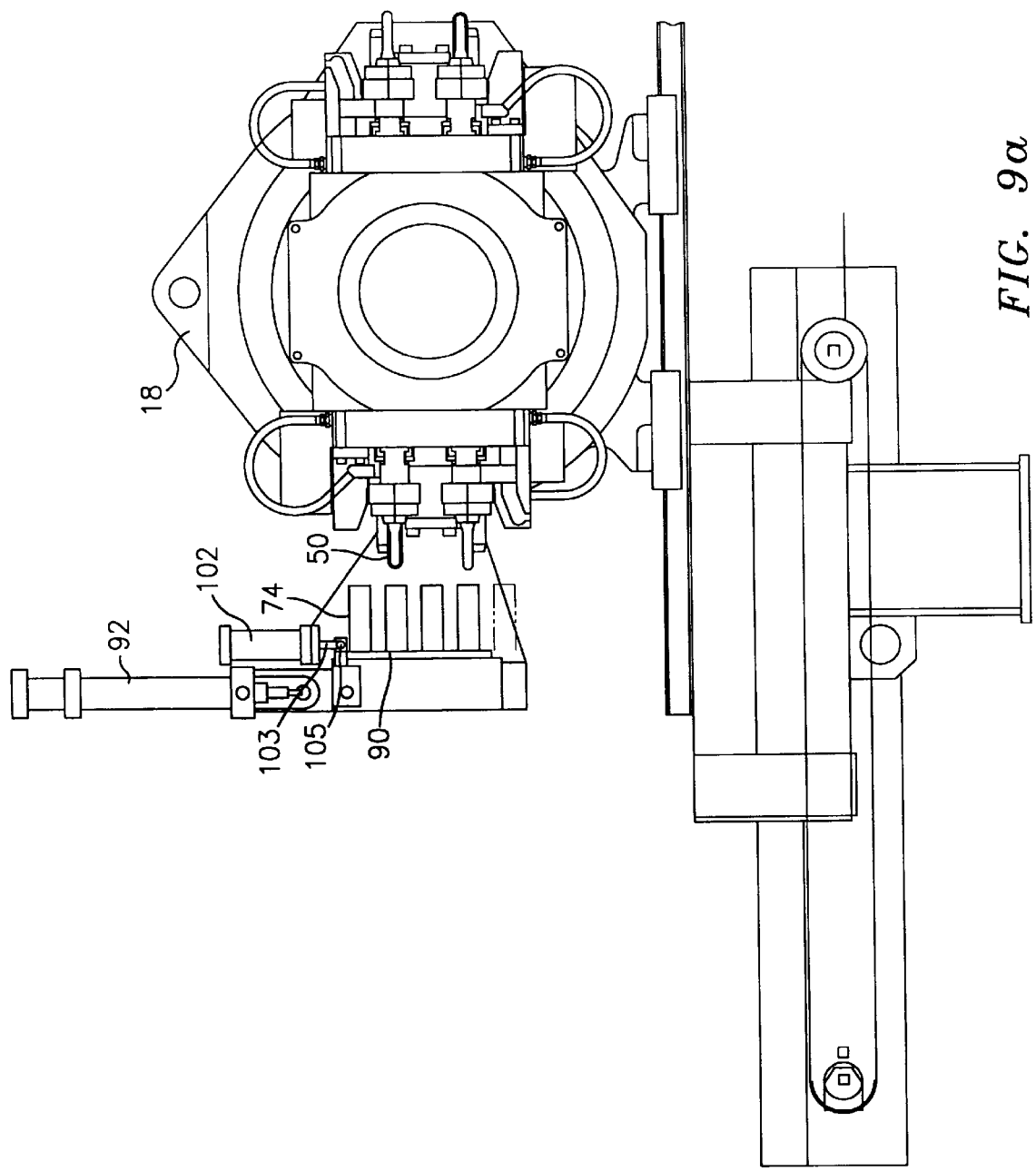

FIGS. 9a–9c illustrate an alternative actuation system for moving the cooling device 62' of FIG. 8a so that the carrier plate 90 moves from a vertical orientation to a horizontal orientation. In this embodiment, the actuator 92 is centrally mounted on a bridge 100 connecting support frames 102 on both sides of the machine 10. The actuator 92, in this arrangement, only effects the vertical positioning of the carrier plate 90. To effect rotation of the carrier plate 90 from the vertical position to the horizontal position shown in FIG. 9c, a separate actuator 102, preferably in the form of a piston-cylinder unit, is provided. The actuator 102 moves vertically with the carrier plate and when it reaches the end of its vertical travel, the actuator arm 103 is moved to rotate the carrier plate 90 about the pivot point 105 so that the parts 50 in the cooling tubes 74 is vertically oriented.

Figure 10B:
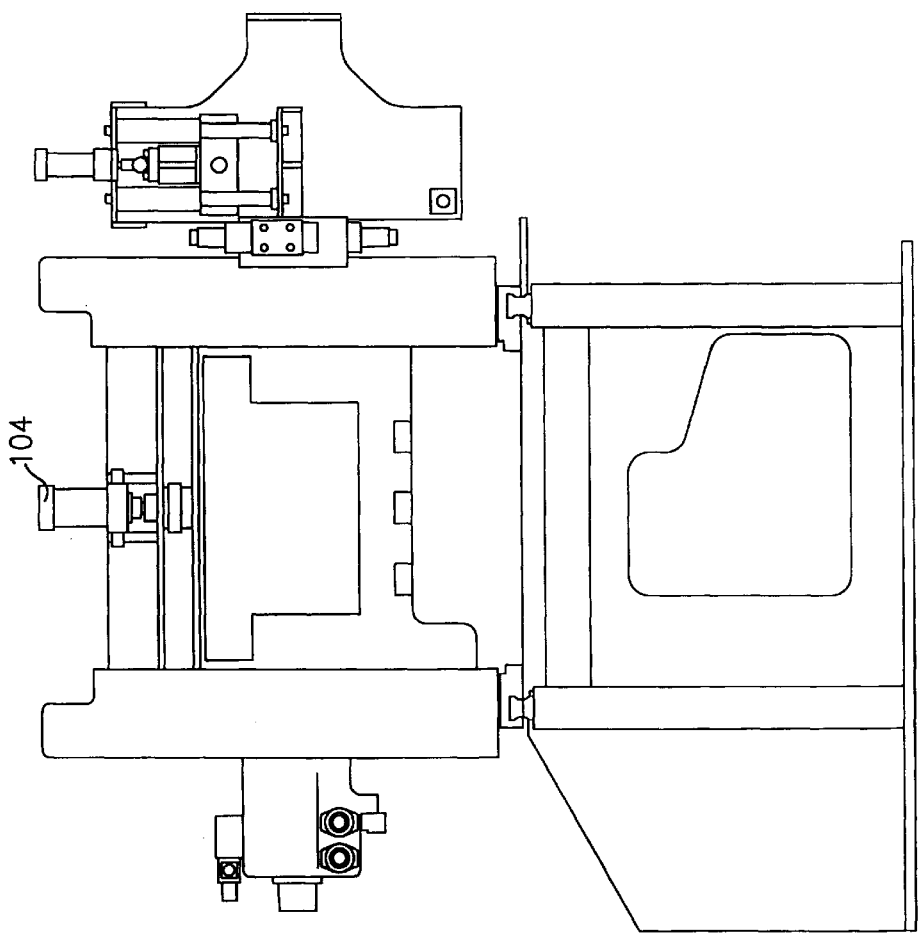
FIGS. 10a and 10b illustrate another alternative actuation system for the cooling device of FIGS. 8a and 8b.
Figure 10A:
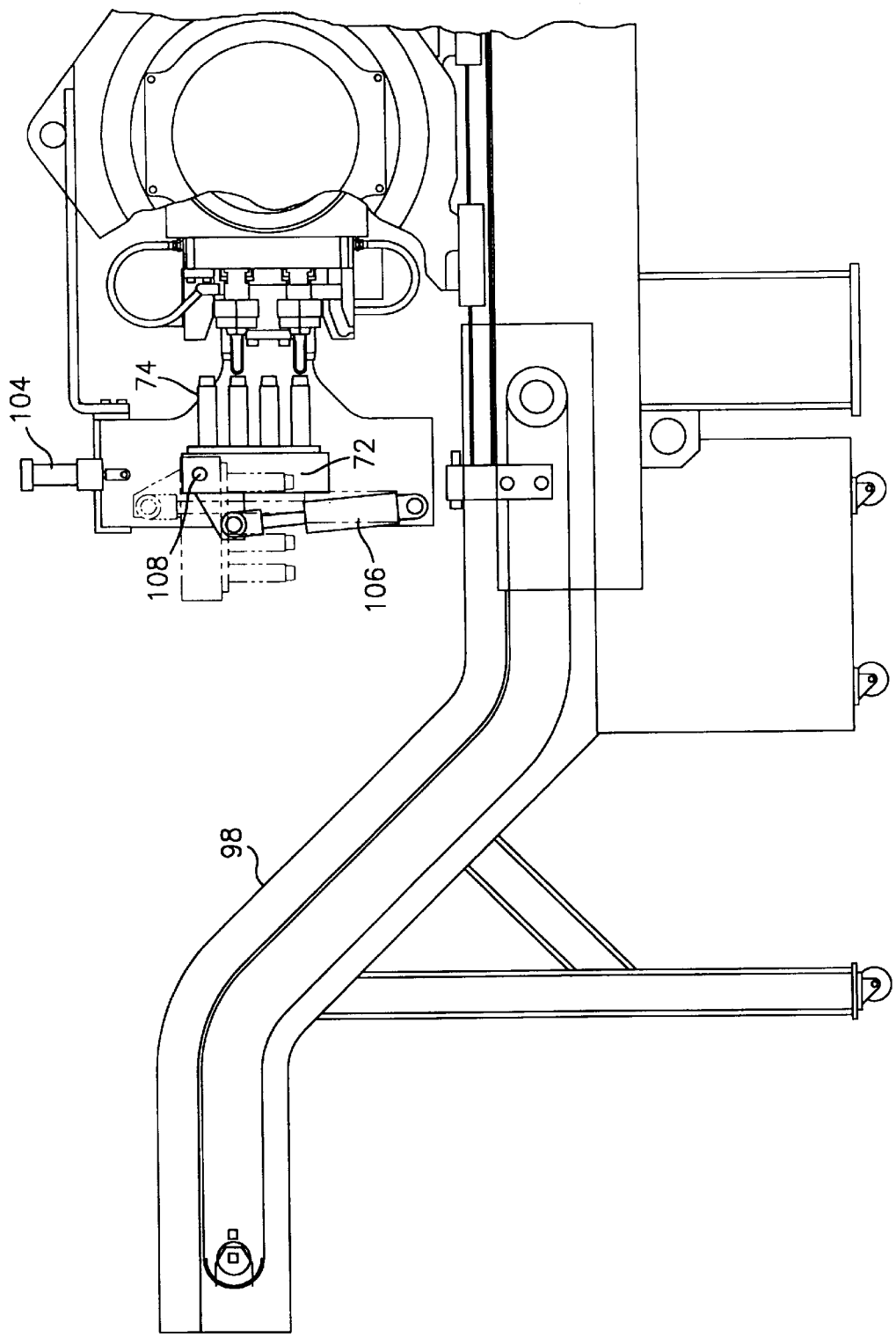

FIGS. 10a and 10b illustrate yet another embodiment of an actuation system for the cooling device 62'. In this arrangement, two cylinders 104 and 106 are used to translate and rotate the carrier plate. As shown in the figure, the carrier plate 72 containing the cooling tubes 74 is pivotally connected at pivot 108 to the frame 64 which is connected to a support structure on the machine 10. The actuator or cylinder 104 may be attached to carrier plate 72 in any suitable manner known in the art and is used to translate the carrier plate 72 with tubes 74 in a vertical direction. This translation may be carried out in any suitable manner known in the art. The actuator or cylinder 106 is connected to the carrier plate 72 and is used to rotate the carrier plate 72 about pivot point 108 so that tubes 74 assume a vertical orientation.

As can be seen from the foregoing discussion, there has been provided in the embodiments of FIGS. 8–10, a lightweight, multi-position cooling carrier plate arrangement for attachment to an index carrier that removes parts horizontally from the mold and cools and ejects them in a vertical orientation, while extending cooling time with multiple tubes.

Figure 11:
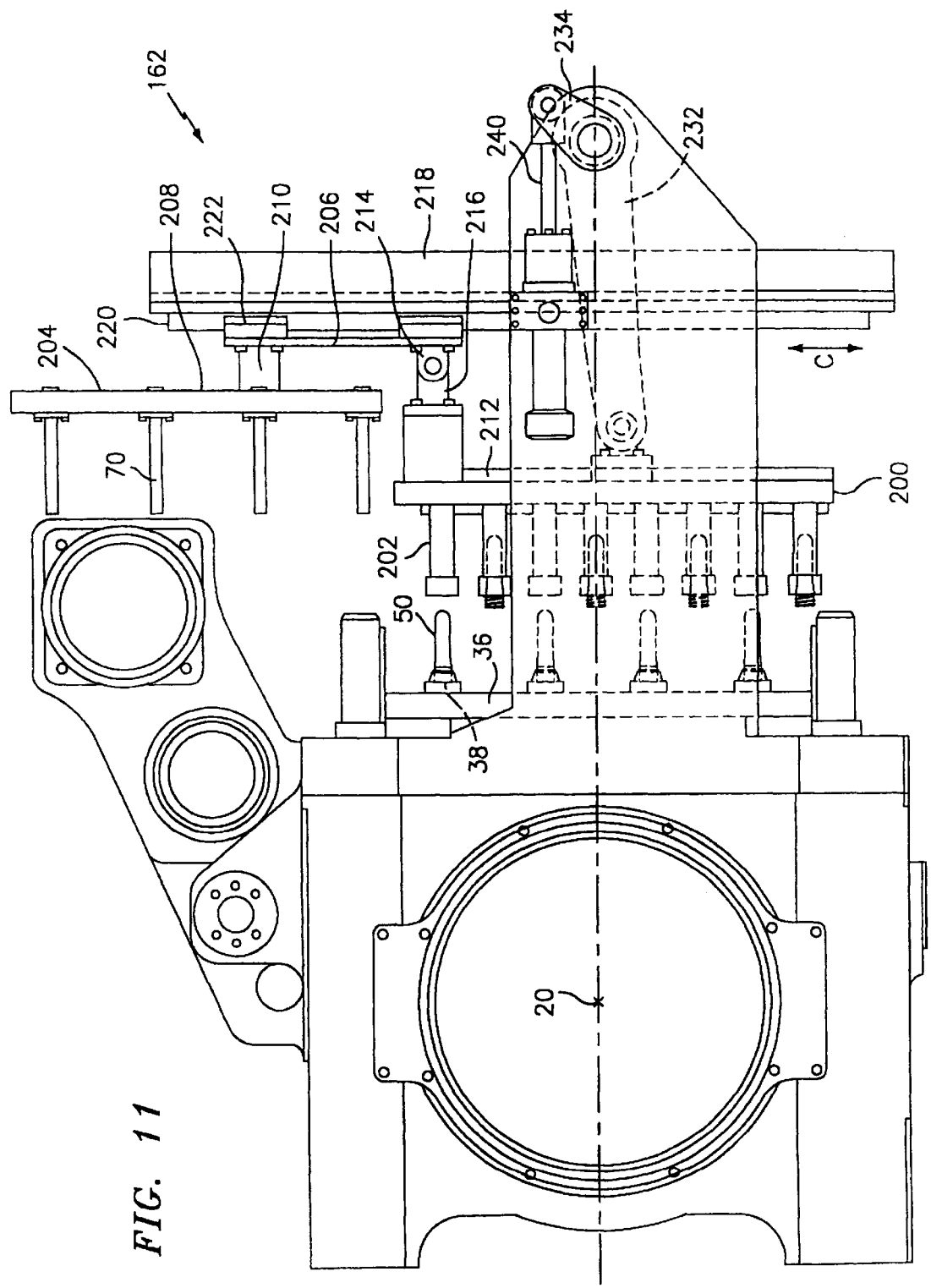
FIG. 11 illustrates a cooling device in accordance with the present invention having a take-off plate in a position adjacent a first face of a rotary turret block and a cooling station assembly in a non-cooling position.

Referring now to FIGS. 11–14, there is shown another embodiment of a device for cooling molded parts on a rotary turret block face and for receiving the molded parts from said face and transferring them to a position where certain ones of the molded parts in the receiving means are being cooled and others of the molded parts in the receiving means are being ejected. The cooling device 162 includes a take-off plate 200 having a plurality of holders 202 on one of its faces for receiving molded parts 50 from the mold core pins 38 of one of the movable mold halves 36. And a cooling station assembly 204 having a plurality of blowing tubes 70 secured to one of its faces. As shown in FIG. 11, the take-off plate 200 and the cooling station assembly 204 are connected to each other via a connecting plate 206. The connecting plate 206 is connected to a rear surface 208 of the cooling station assembly 204 by a rigid connection 210. The rigid connection 210 may comprise any suitable connection known in the art. The connecting plate 206 is connected to a rear surface 212 of the take-off plate 200 via a hinged connection formed by pivotally connected link member 214 and 216.

The device further includes a support 218. The support may be connected to the injection molding machine in any suitable manner known in the art. Alternatively, the support 218 may be connected to a support structure (not shown) which is independent of an injection molding machine. As shown in the Figures, the support 218 has a linear guide 220 along one surface thereof. Preferably, the linear guide is in the form of a track which extends along an axis C which is substantially perpendicular to the central rotation axis 20 of the turret block 16. The connecting plate 206 slides or moves along the linear guide 220. The connecting plate may be provided with any suitable means known in the art such a shoes 222 for permitting movement along the linear guide 220.

As shown in FIG. 11, the take-off plate 200 is in a position adjacent the face of one of the movable mold halves. Selected ones of the holders 202 are aligned with molded parts 50 on the movable mold half 36. This position of the take-off plate is known as the receiving position. At the same time, the cooling station 204 is positioned in a non-cooling position. The molded parts 50 may be transferred to the holders 202 via any suitable means known in the art. For example, the movable mold half 36 may be provided with an injection system for transferring the molded parts 50 to the holders 202. Further, the holders 202 may have a vacuum system (not shown) for assisting in the transfer of the molded parts 50. The vacuum system may comprise any suitable vacuum system known in the art.

Figure 12:
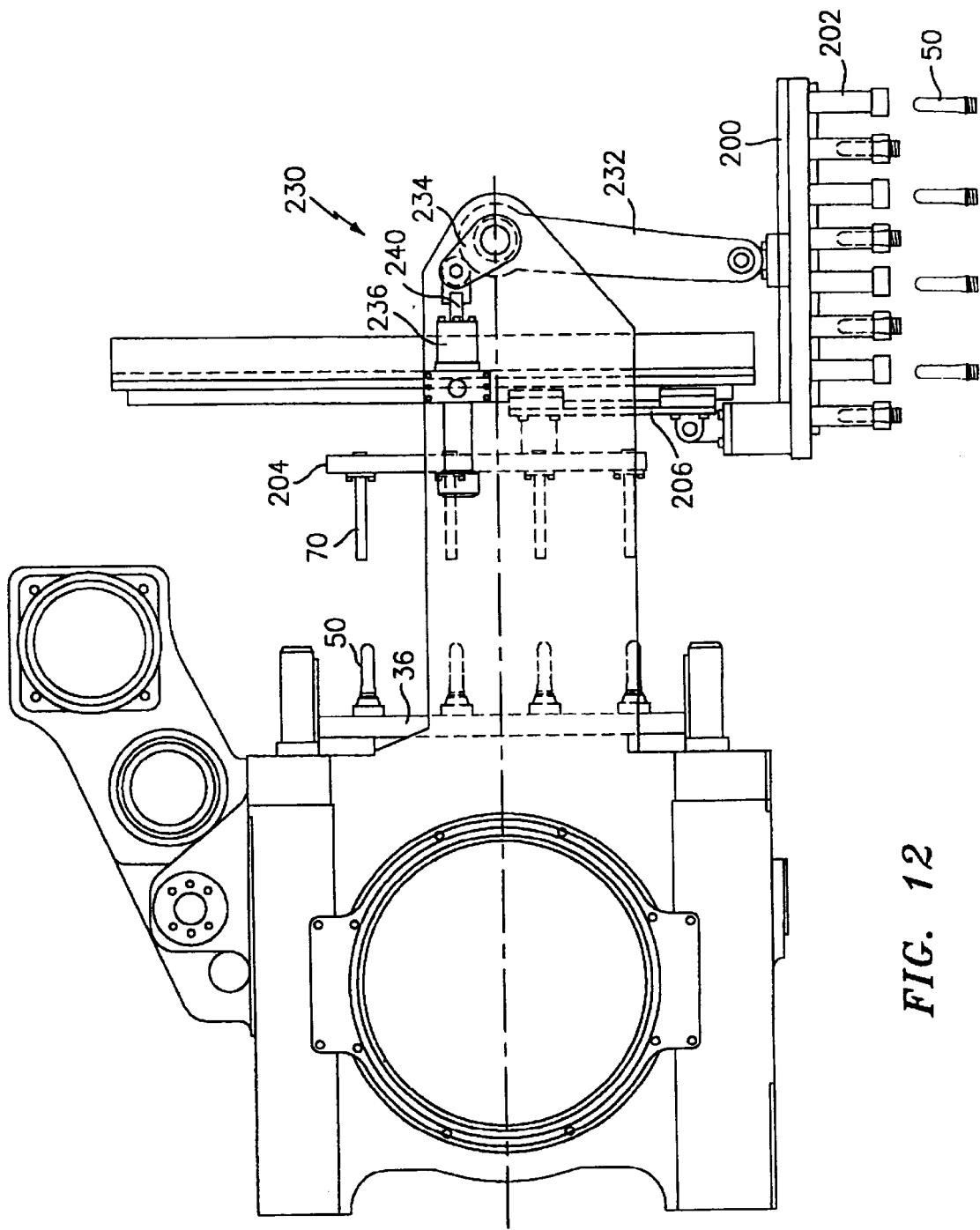
FIG. 12 is a side view of the cooling device of FIG. 11 with the cooling station assembly in a cooling position and the take-off plate assembly in a holding/ejecting position.

Referring now to FIG. 12, it can be seen that the take-off plate 200 has been moved to a second position wherein selected ones of the molded parts are held for additional cooling in a substantially vertical orientation and others of the molded parts are ejected from selected ones of the holders 202 after a desired cooling cycle has been completed. Further, the cooling station assembly 204 has been moved into a position adjacent a new set of molded articles 50 on the face of a second movable mold half 36. In the position, the cooling tubes 70 are utilized to cause a flow of cooling fluid, typically air, against external surfaces of the molded parts 50. To move the take-off plate 200 from the first receiving position to the second holding/ejecting position, an actuation system 230 is provided. The actuation system 230 includes an actuator 236 connected to a pivot arm 234 via a piston arm 240 and a linkage arm 232 connected to a rear surface 212 of the take-off plate and to the pivot arm 234. The actuator unit 236 may comprise any suitable actuator means known in the art. For example, it may comprise a piston cylinder type unit. As shown in FIG. 11, when the piston arm 240 has been extended, the take-off plate 200 is in the first receiving position and when the piston arm 240 is retracted, as in FIG. 12, the take-off plate 200 is in its second holding/ejecting position.

As previously noted, the take-off plate 200 is connected to the connecting plate 206 which is in turn connected to the cooling station assembly 204. As the take-off plate 200 moves from the first receiving position to the second holding/ejecting position, the connecting plate 206 moves along the linear guide 220 along the axis C. This in turn causes translational movement of the cooling station assembly in a direction parallel to the axis C from the non-cooling position shown in FIG. 11 to the cooling position shown in FIG. 12.

Again referring to FIG. 12, it can be seen that certain ones of the molded parts 50 are being ejection when the take-off plate is in this position. the molded parts 50 may be ejected using any suitable means known in the art. For example, a vacuum system used to hold the molded parts 50 in selected ones of the holders 202 may be shut off, thereby causing gravity to drop the molded parts 50 out of the holders 202. Alternatively, the holders 202 may have some form of fluid assist system for ejecting the molded parts 50. After the molded parts 50 have been ejected, selected ones of the holders 202 are vacant.

Figure 13:
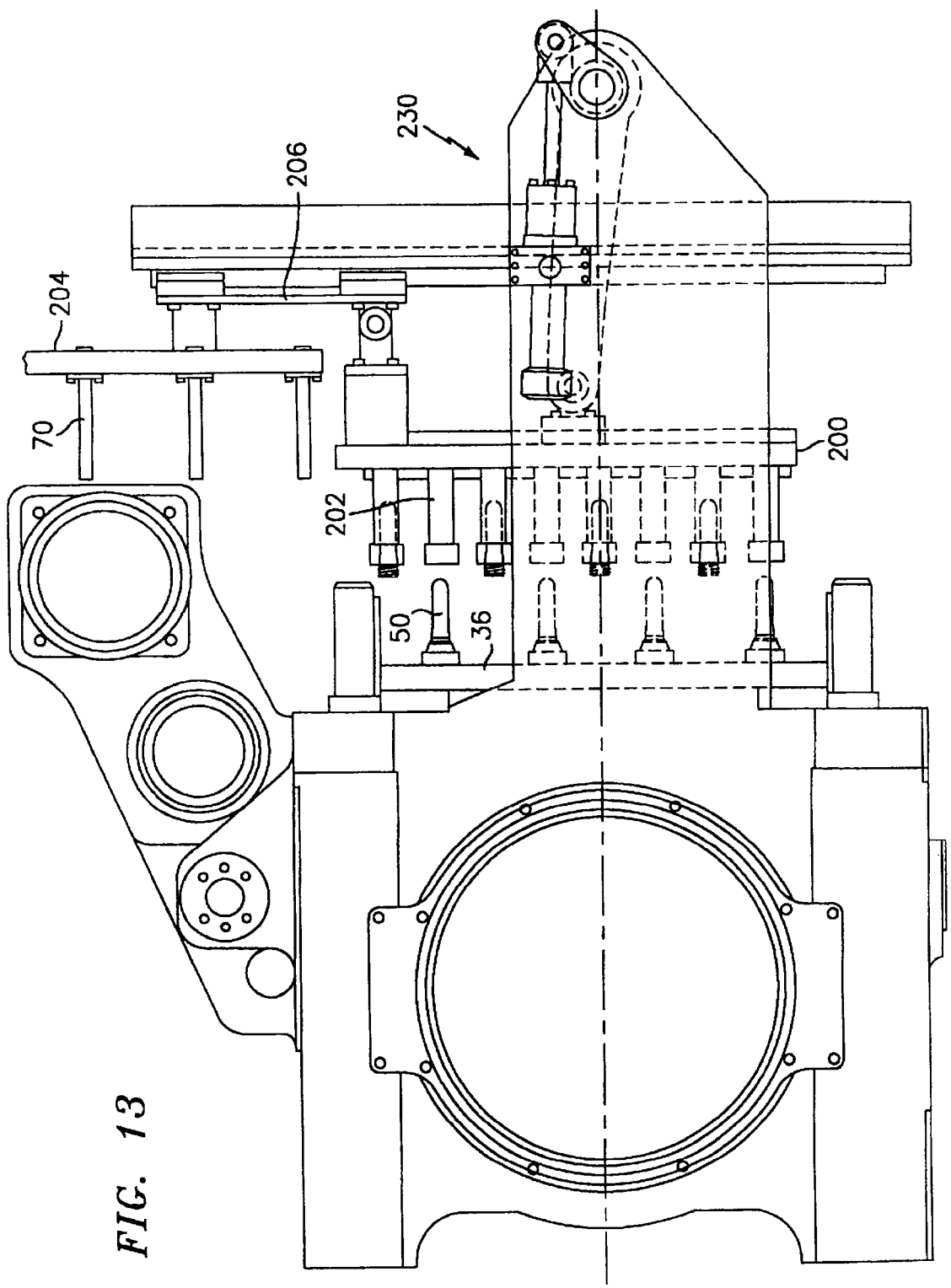
FIG. 13 is a side view of the cooling device of FIG. 11 showing the take-off plate in a position adjacent a face of a second movable mold half and the cooling station assembly in a non-cooling position.

Referring now to FIG. 13, the actuation system 230 is actuated after ejection of the molded parts 50 shown in FIG. 12 to return the take-off plate 200 to the first receiving position. The receiving position differs from the receiving position shown in FIG. 11 in that a different set of holders 202 is aligned with the molded parts 50 on the mold core pins 38 on the movable mold half 36. As can be seen from FIG. 13, movement of the take-off plate 200 from the second holding/ejecting position to the receiving position causes the cooling station assembly 204 to move from the cooling position to the non-cooling position. This movement is effectuated because the rotation of the take-off plate from the second holding/ejection position to the receiving position causes the connecting plate 206 to move along the linear guide 220 as a result of the linkage connections between the take-off plate 200 and the connecting plate 206.

Figure 14:
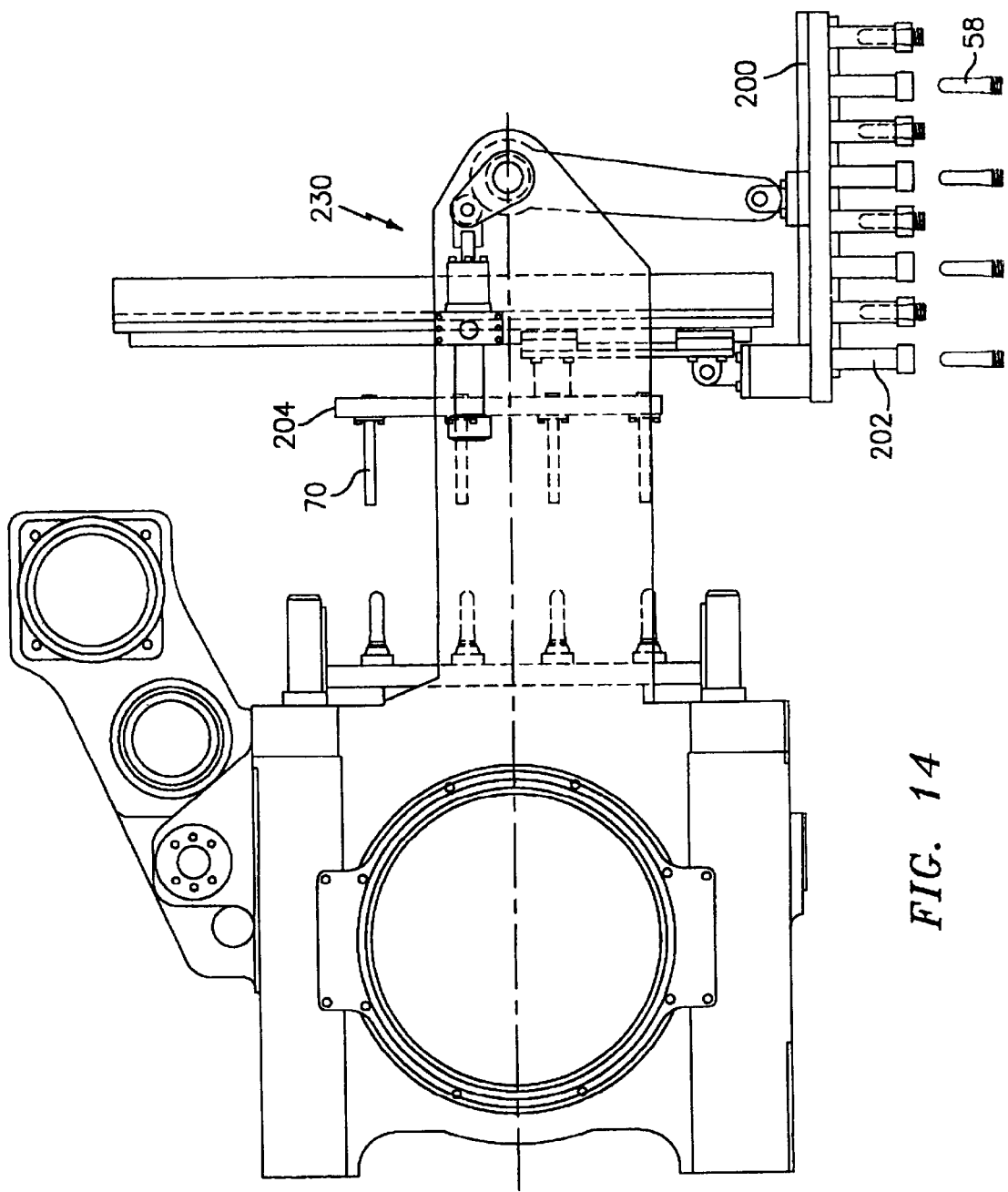
FIG. 14 illustrates the cooling device of FIG. 11 with the take-off plate in its second holding/ejecting position and the cooling station assembly being positioned in a cooling position adjacent a face of a first one of the movable mold halves.

Referring now to FIG. 14, after a second set of molded parts has been transferred from a second movable mold half to the second set of holders 202, the take-off plate 200 is returned to the second holding/ejecting position. Again rotation of the take-off plate 200 from the receiving position to the holding/ejecting position causes the cooling station assembly 204 to move from the non-cooling position to the cooling position so that it is ready to cool the molded parts on the next mold half to be moved into the cooling position. Further, the molded parts 58 which were received by the take-off plate 200 in the previous portion of the molding cycle are now ejected from selected ones of the holders 202.

While the actuation unit 236 has been described as being a piston-cylinder unit, it should also be recognized that an electroservo drive system could be used to cause the rotation of the take-off plate 200 between the receiving position and the holding/ejecting position.

Further, while the cooling devices of the present invention have been described in the context of removing parts from an injection molding machine having a rotary turret block, it should be apparent that the cooling devices could be used with systems other than index molding machine. For example, the cooling devices could be used in a system which has a rotary turret block for receiving molded parts to be cooled from a take-off plate which cooperates with a different form of injection molding machine.

It is apparent that there has been provided in accordance with the present invention a cooling device attached to an index machine which fully satisfies the objects, means and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A device for use with a machine having a rotary turret block mounted within support means, said rotary turret block having at least two faces each of said faces having means for holding at least one molded part, said device comprising:
   means for cooling said at least one molded part on a respective one of said faces when said respective one of said faces is in a cooling position;
   means for receiving said at least one molded part from said respective one of said faces after said at least one molded part has been cooled by said cooling means;

said receiving means being movable to a first position wherein said at least one molded part is received by said receiving means and to a second position with respect to said first position;

means for connecting said receiving means and said cooling means;

said connecting means being movable along a first axis substantially parallel to said respective one of said faces when said respective one of said faces is in said cooling position; and said connecting means causing said cooling means to move from a non-cooling position to a molded part cooling position as said receiving means moves from said first position to said second position.

2. The device according to claim 1, further comprising said connecting means causing said cooling means to move from said cooling position to said non-cooling position when said receiving means moves from said second position to said first position.

3. The device according to claim 1, wherein said at least one molded part received by said receiving means is in a substantially vertical orientation when said receiving means is in said second position.

4. The device according to claim 1, further comprising means for causing said receiving means to move from said first position to said second position.

5. The device according to claim 4, wherein said means for causing said receiving means to move comprises a pivot arm, a linkage arm connecting said pivot arm to said receiving means, and an actuator means for causing said pivot arm to rotate about a second axis, which second axis is substantially perpendicular to said first axis.

6. The device according to claim 1, wherein said receiving means comprises a take-off plate having a plurality of holders for receiving molded parts.

7. The device according to claim 6, wherein at least one holder is aligned with said at least one molded part on a first face during a first part of a molding cycle and wherein at least one other holder is aligned with said at least one molded part on a second face during a second part of a molding cycle.

8. The device according to claim 6, wherein said cooling means comprises a cooling assembly having a plurality of means mounted to a surface of said assembly for applying a cooling fluid to a surface of said molded parts and said connecting means comprises a connecting plate connected to said take-off plate and said cooling assembly.

9. The device according to claim 8, wherein said connecting plate is attached to a rear surface of said take-off plate by two link members pivotally connected together and to a rear surface of said cooling assembly by a rigid connection.

10. The device according to claim 8, further comprising: a support for said device; linear guide means attached to a surface of said support; and said connecting plate being movable along said linear guide means.

11. The device according to claim 8, wherein said blowing means comprises means for blowing cooling air onto each said molded part on a respective one of a first face and a second face.

12. The device according to claim 6, wherein said take-off plate includes means for cooling each said molded part resident in said holders.

13. An injection molding machine comprising:

a first platen carrying a first mold half having one of at least one mold cavity and at least one mold core;

a second platen in association with said first platen, said second platen comprising turret means rotatable on a central axis of rotation for rotating at least two movable mold halves into alignment with said first mold half;

each of said movable mold halves having one of at least one mold cavity and at least one mold core and being movable between a first molding position where it is aligned with said first mold half to form at least one molded part and a second cooling position where it is not aligned with said first mold half;

a device for cooling each said molded part and for receiving cooled parts from said movable mold halves, said device comprising;

means for cooling said at least one molded part on a respective one of said movable mold halves when said respective one of said movable mold halves is in said cooling position;

means for receiving said at least one molded part from said respective one of said movable mold halves after said at least one molded part has been cooled by said cooling means;

said receiving means being movable to a first receiving position wherein said at least one molded part is received by said receiving means and to a second holding/ejecting position with respect to said first position; means for connecting said receiving means and said cooling means;

said connecting means being movable along a first axis substantially parallel to said respective one of said movable mold halves when said respective one of said movable mold halves is in said cooling position; and said connecting means causing said cooling means to move from a non-cooling position to a molded part cooling position as said receiving means moves from said first receiving position to said second holding/ejecting position.

14. The injection molding machine according to claim 13, further comprising:

means for moving said rotatable turret block means to bring a first one of said movable mold halves into a mold closed position;

means for injecting plastic material into a mold formed by said first mold half and said first one of said movable mold halves and thereby forming at least one molded part;

said moving means further comprising means for moving said rotatable block means and said first one of said movable mold halves to a mold open position where said at least one molded part is resident on said first one of said movable mold halves; and means for rotating said turret block means to cause said first one of said movable mold halves to rotate from said mold open position to said second cooling position and to cause a second one of said movable mold halves to move to said first molding position.

15. The injection molding machine according to claim 14, wherein said rotating means causes said rotary turret block means to rotate 180 degrees to move said first one of said movable mold halves from said first molding position to said second cooling position and said second one of said movable mold halves from said second cooling position to said first molding position.

16. The injection molding machine according to claim 13, further comprising said connecting means causing said cooling means to move from said cooling position to said non-cooling position when said receiving means moves from said second holding/ejecting position to said first receiving position.

17. The injection molding machine according to claim 16, wherein said at least one molded part within said receiving means is in a substantially vertical orientation when said receiving means is in said second holding/ejecting position.

18. The injection molding machine according to claim 13, wherein said cooling device further comprising means for causing said receiving means to rotate from said first receiving position to said second holding/ejecting position and said means for causing said receiving means to rotate comprising a pivot arm, a linkage arm connecting said pivot arm to said receiving means, and an actuator means for causing said pivot arm to rotate about a second axis, which second axis is substantially perpendicular to said first axis.

19. The injection molding machine according to claim 13, wherein said receiving means comprises a take-off plate having a plurality of holders for receiving molded parts and means for cooling said molded parts within said plurality of holders.

20. The injection molding machine according to claim 19, wherein at least one of said holders is aligned with at least one molded part on said first movable mold half during a first part of a molding cycle and wherein at least one other of said holders is aligned with at least one molded part on said second movable mold half during a second part of a molding cycle.

21. The injection molding machine according to claim 19, wherein said cooling means comprises a cooling assembly having a plurality of means for blowing air mounted to a surface of said assembly and said connecting means comprises a connecting plate connected to said take-off plate and said cooling assembly.

22. The injection molding machine according to claim 21, wherein said connecting plate is attached to a rear surface of said take-off plate by two link members pivotally connected together and to a rear surface of said cooling assembly by a rigid connection.

23. The injection molding machine according to claim 22, further comprising a support for said device and linear guide means attached to a surface of said support and said connecting plate being movable along said linear guide means.

24. A process for forming cooled molded parts comprising the steps of:

providing an index molding machine having a first platen carrying a first mold half having at least one of a mold core and a mold cavity and a second platen comprising rotatable turret block means rotatable on a central axis of rotation for rotating at least two movable mold halves into alignment with said first mold half, each of said movable mold halves having at least one of a mold core and a mold cavity;

moving said rotatable turret block means to bring a first one of said movable mold halves into alignment with said first mold half and then into a mold closed position with said first mold half;

clamping said first mold half and said first one of said movable mold halves;

injecting molten material into a mold formed by said clamped first mold half and said first one of said movable mold halves to form a first molded part set comprising at least one molded part;

holding said first one of said movable mold halves in said mold closed and clamped position while cooling said first molded part set;

moving said rotatable turret block means to a mold open position where said first molded part set is positioned on said first one of said movable mold halves;

rotating said turret block to bring said first molded part set to a cooling position;

providing a device adjacent said cooling position, said device including a cooling assembly having means for applying a cooling fluid to each molded part in said first molded part set, means for receiving each molded part in said first molded part set, and means connecting said cooling assembly and said receiving means;

moving said cooling assembly into a cooling position aligned with said first molded part set and applying a cooling fluid to said first molded part set;

translating said cooling assembly along a translation axis substantially perpendicular to said central axis of rotation and thereby moving said receiving means into a first position aligned with said first molded part set;

transferring each said molded part forming said first set from said first one of said movable mold halves to said receiving means;

moving said receiving means so as to move said receiving means from said first receiving position to a second holding/ejecting position; and said receiving means moving step causing said connecting means to translate along said translation axis and thereby causing said cooling assembly to move to said cooling position.

25. The process according to claim 24, wherein said receiving means moving step comprises rotating said receiving means until said first set of molded parts is in a substantially vertical orientation.

26. The process according to claim 24, further comprising moving said receiving means from said second holding/ejecting position to said first receiving position so that said receiving means is positioned to receive a second set of molded parts from said second one of said movable mold halves and thereby causing said connecting means and said cooling assembly to move along said translation axis.

* * * * *